3,485,374
REVERSE OSMOSIS MODULE
Serop Manjikian, 127 7th St., and Michael D. Maurer, 142 8th St., both of Del Mar, Calif. 92014
Filed May 9, 1968, Ser. No. 727,785
Int. Cl. B01d 13/00
U.S. Cl. 210—321                    10 Claims

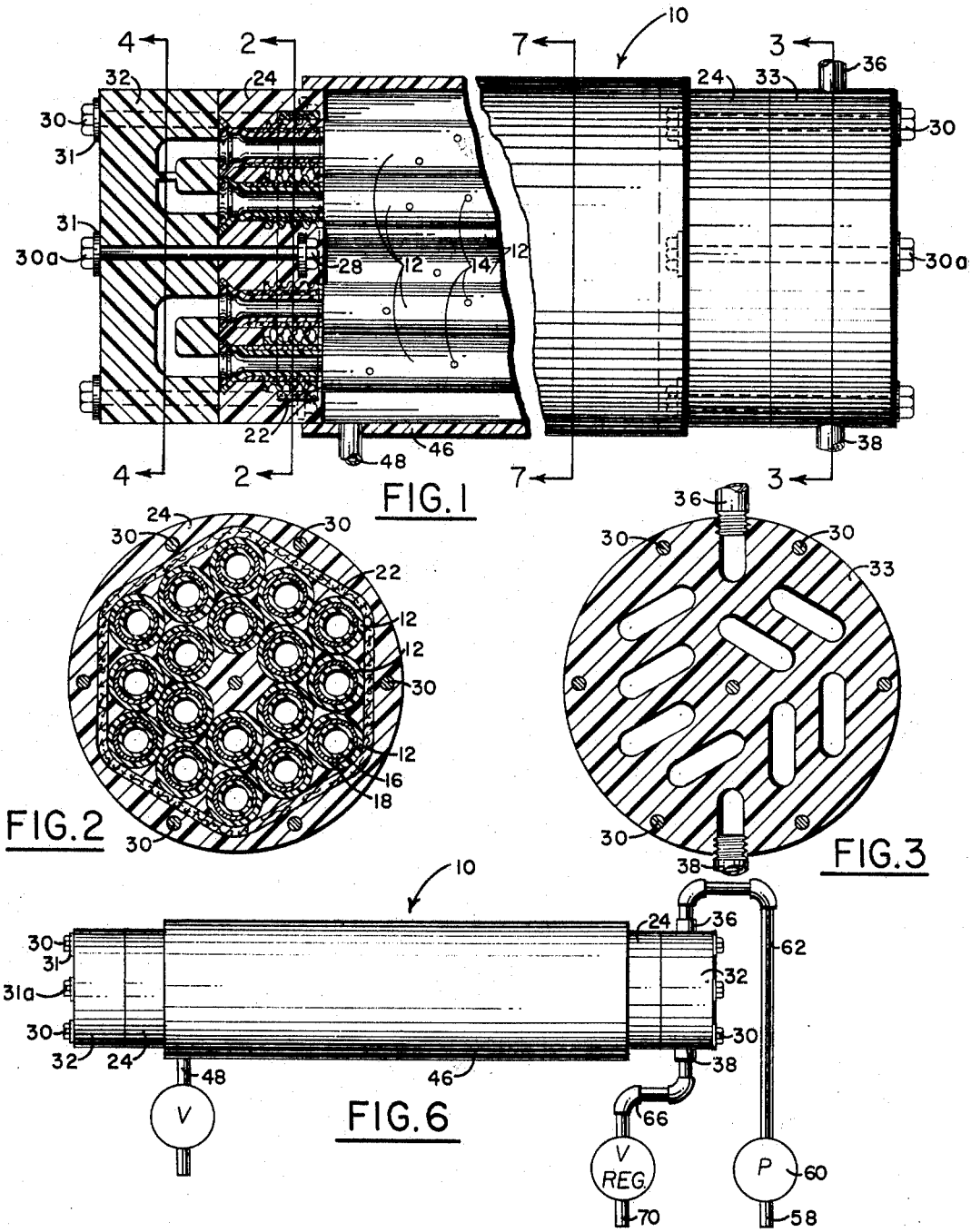

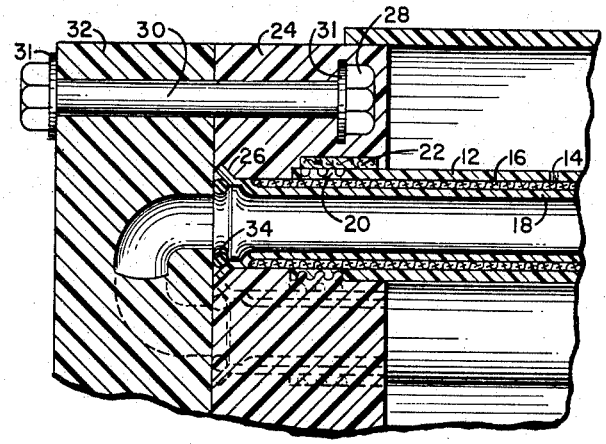
FIG. 5
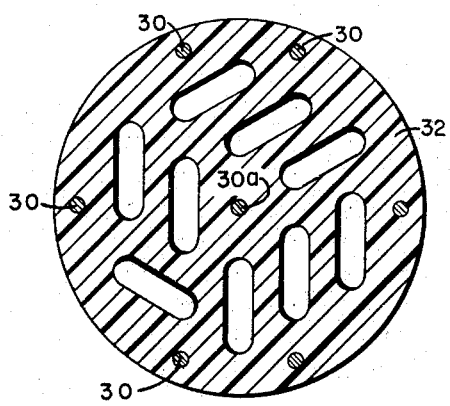
FIG. 4
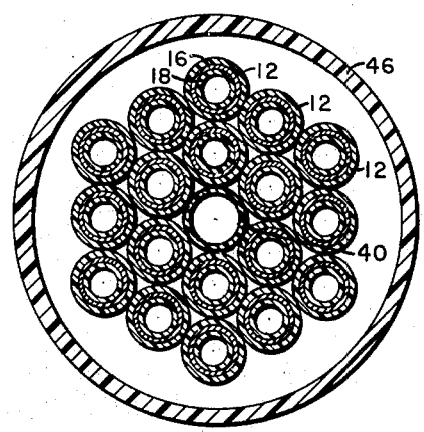
FIG. 7
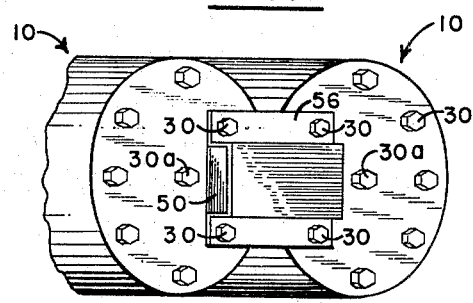
FIG. 9
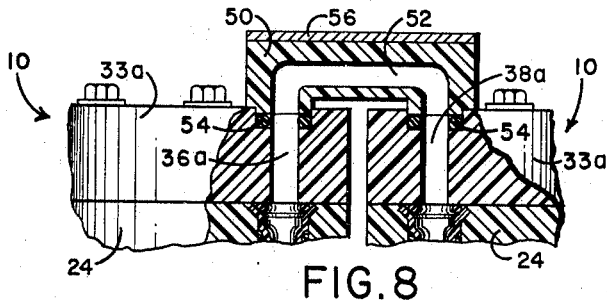
FIG. 8
INVENTORS.
SEROP MANJIKIAN
MICHAEL D. MAURER
BY 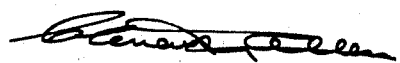
Agent

United States Patent Office 3,485,374
Patented Dec. 23, 1969

ABSTRACT OF THE DISCLOSURE

A module, useful in reverse osmosis apparatus, contains a bundle of backing tubes having cast-on end flanges, the backing tubes being lined with semipermeable membranes. Strong wrappings for example of glass fiber tape are placed around the ends of the bundle of tubes and are embedded in cast end flanges. Nuts for bolts to attach end plates are also embedded in the flanges. An outer tube to collect product water surrounds the membrane tube bundle and is attached at its ends to the end flanges; and module end plates may be joined to connect modules in series.

---

This invention relates to apparatus for treating solutions by reverse osmosis. It relates particularly to a compact, strong module containing a plurality of tubular semipermeable membranes which, when a solution is introduced thereinto under pressure, can produce a purified solution, and a concentrated brine.

Reverse osmosis is a process now becoming recognized as commercially practical for purifying solutions, including brackish water and sea water; and also producing a solution concentrate which may be the primary product as in processes for concentration of fruit juices and other comestibles. Considerable advantage attaches to use of semipermeable membranes in the form of tubes, but in order to provide sufficient membrane surface area, a number of membrane tubes are most often employed. These are assembled inside porous backing tubes in a cluster or bundle with connections one to another to provide a long flow path. For example a bundle of say 18 half-inch tubes each 4 feet long can provide an effective tube length of about 72 feet with about 7.2 square feet of membrane surface area. The diameter of the membrane tubes has been found to be advantageously about ¾ inch or less since this provides turbulent flow to reduce concentration polarization at the membrane surface without requiring excessive pumping capacity.

Pressures required for the reverse osmosis process depend mostly on the concentration of salts in the solution being treated. For brackish water purification 400 to 800 p.s.i.g. has been found effective. For sea water desalting, a pressure of 1200 p.s.i.g. or higher is generally required to produce purified water from the 35,000 p.p.m. sea water feed. Because of high operating pressures, reverse osmosis apparatus must be strongly constructed to guard against fracture or bursting, and leakage of joints and seams. Additionally, the corrosive nature of salty water makes corrosion resistance essential in materials of construction both to eliminate product contamination, and to prevent structural weakening from corrosive attack. Stainless steel and other corrosion resisting metals are useful, but are expensive and difficult to machine and fabricate. Plastics can be used to great advantage because of corrosion resistance and ease of fabrication, but plastic modules must be carefully designed to insure proper safety factors, particularly when operated at higher pressures.

Summarized briefly, this invention provides a compact efficient reverse osmosis module which can be fabricated of plastics and which is strong enough to be safely operated at pressures up to 1200 to 1500 p.s.i.g. that is high enough for sea water desalting. This is accomplished by providing in a module, a bundle of elongated porous tubes lined with semipermeable membranes, and which are fixedly attached at their ends to end sealing assemblies. The tubes constituting the bundle are arranged symmetrically around a central space and end flanges are cast on to the tube ends, the bundle of tube ends being wrapped circumferentially with high strength material such as glass fiber. When the end flanges are cast around the tube ends the glass fiber wrappings become embedded in the flanges. End plates are attached to the end flanges by bolts whose holding nuts are also embedded in the cast end flanges. The end sealing assemblies contain conduits for connecting selected tube ends to an inlet for water to be treated, an outlet for concentrated solution, and for connecting ends of said tubes one to another. Means may also be provided for connecting modules together by means of a block having a conduit connecting an inlet of one module to an outlet of another, such block being maintained in sealing engagement with said module end plates over said inlet and outlet preferably by means of the bolts also attaching the end plates to the end flanges.

The construction and operation of the improved module of this invention may be more clearly and readily understood by reference to the drawings in which:

FIG. 1 shows a general side view, broken out to show a central vertical section at one end, of a module embodying features of this invention.

FIG. 2 shows a vertical cross section of the module of FIG. 1 taken along the line 2—2.

FIG. 3 shows a vertical cross section of the module of FIG 1 taken along the line 3—3.

FIG. 4 shows a vertical cross section of the module of FIG. 1 taken along the line 4—4.

FIG. 5 shows in vertical section a fragmentary detail of a tube end sealed into a cast-on end flange.

FIG. 6 illustrates a system employing the module of FIG. 1 and which may be used, for example, for purifying brackish water.

FIG. 7 shows a cross section of an alternative design of the module tube bundle taken vertically and centrally across the module.

FIG. 8 illustrates, partly in vertical section, a connector block in place joining and connecting two modules.

FIG. 9 shows a perspective view of the end of the two modules connected as in FIG. 8, but drawn on a somewhat reduced scale.

Referring now particularly to FIGS. 1, 2, 3, and 4, a module 10 is composed of a plurality of porous tubes 12 which are assembled in side-by-side relationship symmetrically in a bundle. These tubes are fabricated of material suitably resistant to the pressure under which they are operated and may, for example, be made of ABS plastic drilled at intervals with small holes as at 14 to provide porosity. Conveniently, the tubes, which in the embodiment illustrated number 18 may be arranged as shown in FIG. 2. Other numbers of tubes may, of course, be employed for specific purposes. Each tube is lined as shown in FIG. 5 with a porous liner such as of woven nylon fabric 16, and this in turn is lined with semipermeable membrane 18. The ends of tubes 12 are circumferentially grooved as at 20 and strong wrappings, advantageously of fiber glass tape, are wrapped around the bundle of tube ends as at 22. The wrappings 22 may overlap some circumferential grooves 20 as shown more clearly in FIG. 5.

End flanges 24 are cast around the ends of tubes 12 and are conveniently of high strength plastic such as an epoxy composition which contracts on hardening, to form tight bonds with the surfaces and circumferential grooves 20 of tubes 12. The mold for casting of end flanges 24 is made to provide flaring extensions of the insides of tubes 12 as at 26 and membranes 18 line these flares as shown. Cast end flanges 24 embed wrappings 22 which are placed around the ends of tubes 12 and also embed nuts 28 which are arranged to receive the threaded ends of bolts 30 which with their washers 31 maintain end plates 32 and 33 against end flanges 24. Seals are effected between end plates 32 and 33 and the interiors of tubes 12 by O-rings 34 which overlay the membranes lining flares 26 and seal against abutting surfaces of end plates 32 and 33.

Conduits are arranged in end plates 32 and 33 to interconnect the membrane lined passages in tubes 12. At one end of the module the conduits are arranged, in the example illustrated in FIG. 4, to connect the tube ends to provide series flow, that is to make a long continuous passageway out of the connected tubes. At the oher end of the module the conduits in end plate 33 are modified as shown in FIG. 3 to include communication with an inlet connection at 36, and an outlet at 38, or these may be reversed if desired. Thus the flow through the bundle of tubes 12 starts at inlet 36, flows through all tubes 12 in series and outflows from outlet 38.

Centrally located in end flanges 24 and end plates 32 and 33 are bolts 30a which because of their central positions add considerably to the strength of the assembly. Bolts 30a, like bolts 30 are threaded into buried nuts 28. Bolts 30a, however, take up the central spaces in the module ends so that a central tube 12 is omitted from the bundle, and the tubes are therefore arranged symmetrically but around a central space. In the modifications of the module shown in cross section in FIG. 7, the space in the center between module tubes is occupied by circular cross section body, specifically tube 40, which is helpful to space the rods 12 and particularly to keep them from inwardly warping if the bundle is wrapped externally as at 42, with for example glass fiber tape. Conveniently, the central tube 40 may be of the same diameter and type as the tubes 12. Spacer tube 40 will be of length less than the distance between the end flanges 24 and functions efficiently when simply placed in position and maintained there by the surrounding bundle of tubes 12.

Product water passing through membranes 18 and the porous walls of tubes 12 is collected in outer tube 46 which in the embodiment illustrated is joined by gluing to the inner ends of flanges 24 or which may be molded on to these parts when they are cast. Product tube 46 is provided with a pipe connection at 48 for drawing off collected product water.

Blocks for connecting modules together are illustrated in FIGS. 8 and 9. In this case the end plates are designed slightly differently with the inlet and outlet conduits 36a and 38a coming out through the top surface of the end plate 33a instead of out of the side as do conduits 36 and 38 in end plate 33 illustrated in FIG. 1. Block 50 is provided to span two modules 10 and has an internal conduit 52 which will connect conduits 36a and 38a when the block 50 is in place as shown. The edges of conduit 52 are sealed to 36a and 38a respectively by O-rings 54. Block 50 is held in place in firm sealed pressure-tight relationship with module end plates 33a by channel member or hat 56 which is advantageously of strong material, for example, stainless steel. It overlays block 50 and is tightened in position by passage through its foot portions of selected bolts 30, which as previously described also hold end plates 33a on to flanges 24.

Operation of the module of this invention may be best understod by reference to FIG. 6 which illustrates a reverse osmosis system employing the module 10. When used, for example for purifying brackish water, this will be introduced through pipe 58 from a source not shown into pump 60 which will raise its pressure to that required for reverse osmosis and which is this case will be about 600 p.s.i.g. The feed water at this pressure is led through pipe 62 into module inlet 36 and then into the membrane lined tubes 12. These are connected in series through the conduits in end plates 32 and 33. As the feed water flows through the semipermeable membrane lined tubes purified water passes through the membranes and is collected in outer tube 46 and from here it may be drawn off as desired or necessary through connection 48 and valve 64. The water flowing through tubes 12 and becoming more concentrated with respect to soluble salts contained in the feed water, is discharged from module 10 through outlet 38 which is connected by pipe 66 to pressure regulator valve 68. The rate of discharge from regulator valve 68 is arranged to maintain the pressure of water within the module at its working pressure of about 600 p.s.ig. About 20 to 50% of the feed water is normally discharged through drain 70 as brine.

The various features of this invention cooperate to provide a module which can readily be economically fabricated of plastic yet be strong enough for service at high pressure for example at 1200–1500 p.s.i.g. required for desalination of sea water. The glass fiber wrapping 22 around the ends of the membrane backing tubes adds substantially to the strength of the assembly. Tests comparing the burst strength of a similar organization of ⅜-inch tubes in a module with and without the wrapping 22, showed a static burst at 1350 to 1500 p.s.i.g. when no wrapping was used, and at 2300 to 2500 p.s.i.g. when the wrapping was employed as described. Tests were made by using non-porous tubes, then sealing the outlet and pumping water into the module until burst. Apparently the glass fiber tape when embedded in the flange structure supplies considerable extra strength, about 60% more, against radial cracking and burst, which has heretofore been the fracture mode of the assembly. A strength of 2500 p.s.i.g. provides a margin of safety when the module is operated for sea water desalting at pressures up to about 1500 p.s.i.g.

The buried nuts 28, into which tie bolts 32 and 32a are threaded, apparently provide much better contact and pressure distribution than if they are simple threaded on a protruding bolt end. Additionally the buried central nut enables a central bolt 32a to be employed, considerably strengthening the fastening between the flange 24 and end plate 32, and distributing the load more evenly over the cross sectional area of these elements.

The enclosed collector tube adds slightly to the strength of the assembly but more importantly provides a closed, and integral water collection chamber for each module. The closed compartment minimizes contamination of the product water. An additional advantage is that the product water from each module can be collected separately and then combined if desired. This enables close control to be obtained over the production from individual modules and permits sampling from each if required.

The connector block design allows a plurality of modules to be interconnected and at the same time structurally assembled into banks, tiers or groups. The plastic block provides a pressure tight connection between modules with the strengthening hat maintaining the block in place with considerable backing strength.

We claim:
1. Apparatus for treatment of solutions by reverse osmosis which comprises a module having a bundle of elongated porous tubes lined with semipermeable membranes, said tubes being fixedly attached at their ends to end sealing assemblies containing conduits for connecting ends of said tubes, one to another, to an inlet for water to be treated, and to an outlet for concentrated solution, wherein the improvements comprise:
  (a) said porous tubes being symmetrically arranged around a central space; and,
  (b) said end sealing assemblies comprising:
     (i) end flanges of high strength plastic cast around ends of said bundle of porous tubes, said bundle of tube ends being wrapped with glass fiber embedded in said cast end flange;
     (ii) end plates attached to and maintained in sealing engagement with said end flanges.
2. Apparatus according to claim 1 in which said glass fiber wrapped around said bundle of tube ends in (b) is a multilayer wrapping of glass fiber tape.

3. Apparatus according to claim 1 in which an elongated circular cross section body occupies the central space around which the porous tubes in (a) are arranged.

4. Apparatus according to claim 3 in which said circular cross section body is a tube of substantially the same diameter as the porous tubes in (a).

5. Apparatus according to claim 1 in which said end plates are attached to said end flanges by bolts passing through said end plates and threaded into nuts embedded in said end flanges.

6. Apparatus according to claim 5 in which said bolts are arranged around the outer part of said end plate and with one bolt located centrally in said end plate.

7. Apparatus according to claim 1 in which an enclosing collector tube surrounds the bundle of porous tubes, said collector tube having its ends fixedly attached in sealing engagement to said flanges at the ends of said module.

8. Apparatus according to claim 7 in which the module end flanges are cast into the ends of said collector tube and bonded thereto.

9. Apparatus according to claim 1 in which said module is provided with means for attaching it to another module comprising a block attached to an end plate of said module and adapted to be attached to the end plate of said other module to maintain said modules in fixed relationship, said block covering, and being sealed to, an inlet in one module and an outlet in the other module and said block containing a conduit to connect said outlet to said inlet.

10. Apparatus according to claim 9 in which said block is attached to a module end plate by the bolts passing through said end plate to attach it to a flange in (b)(ii), said bolts passing through foot portions of a channel member overlaying said block.

References Cited

UNITED STATES PATENTS 3,430,770  3/1969  Clark et al. _____ 210—321

REUBEN FRIEDMAN, Primary Examiner

FRANK A. SPEAR, Jr., Assistant Examiner

U.S. Cl. X.R.

210—252, 323, 433